March 30, 1926. 1,579,120
E. J. KRAMER
TACK DRIVER
Filed Feb. 25, 1925  3 Sheets-Sheet 2

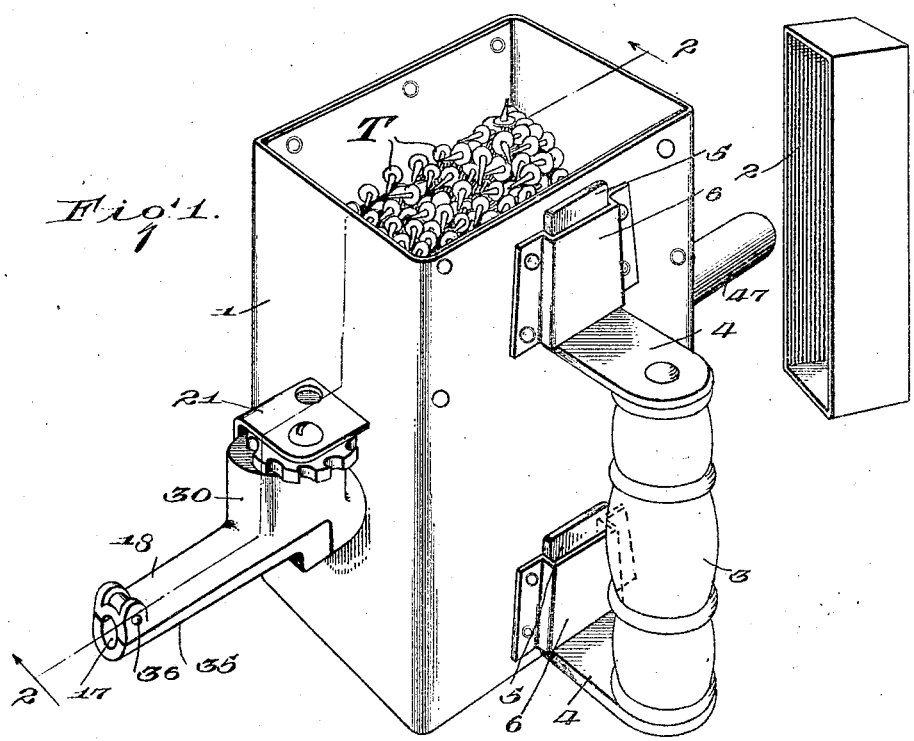
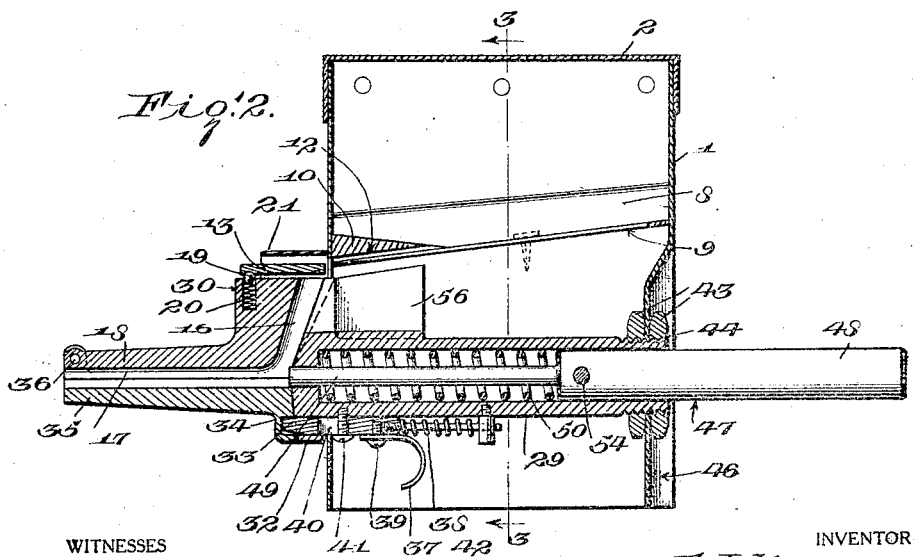

WITNESSES
H. Fowler
J. T. Schrott

INVENTOR
E. J. Kramer
BY
Munn & Co.
ATTORNEYS

March 30, 1926.
E. J. KRAMER
TACK DRIVER
Filed Feb. 25, 1925
1,579,120
3 Sheets-Sheet 3
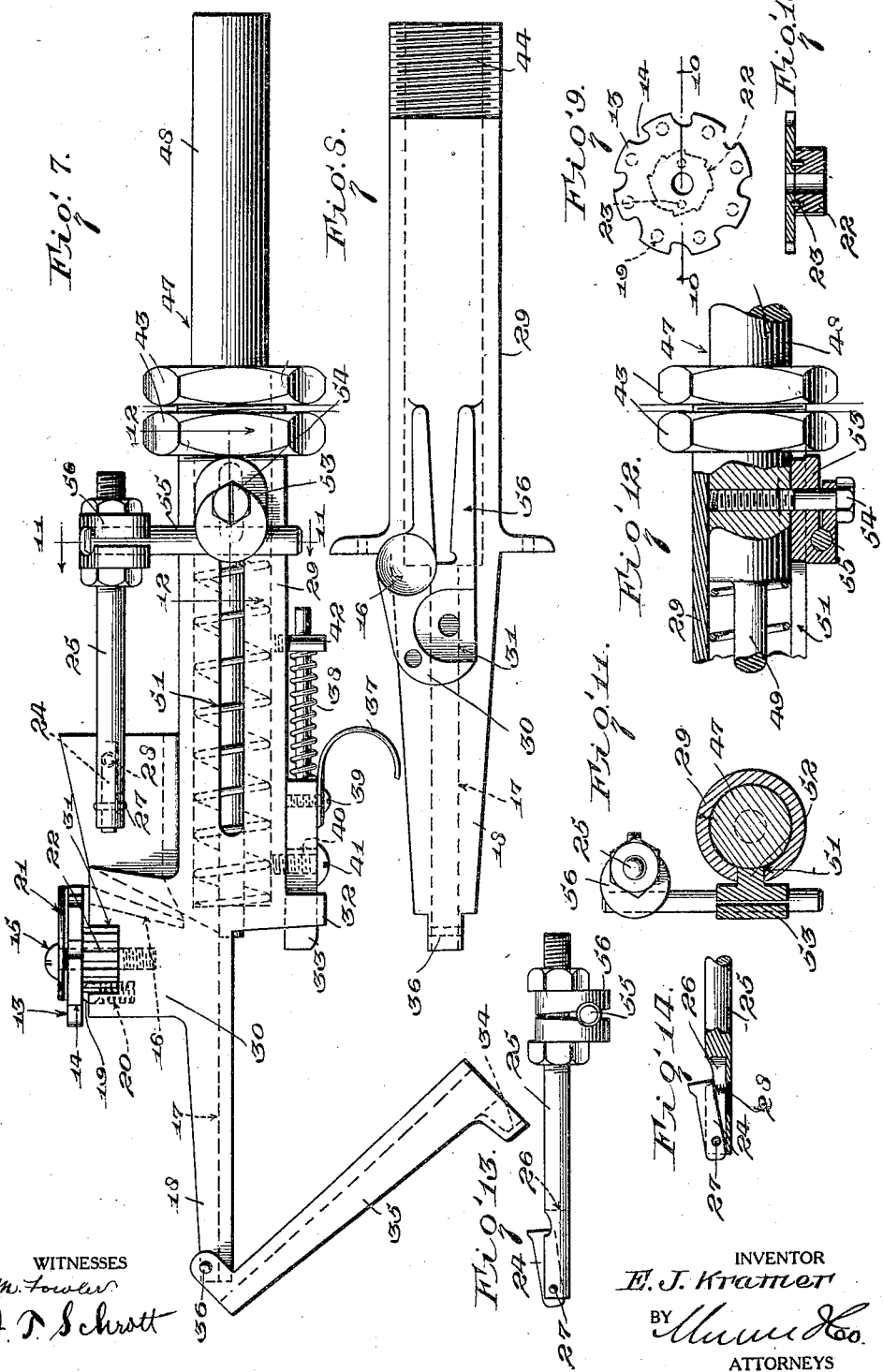
WITNESSES
INVENTOR
E. J. Kramer
BY
ATTORNEYS Patented Mar. 30, 1926.

1,579,120

UNITED STATES PATENT OFFICE.

EDWARD JOSEPH KRAMER, OF GREEN BAY, WISCONSIN.

TACK DRIVER.

Application filed February 25, 1925. Serial No. 11,549.

*To all whom it may concern:*

Be it known that I, EDWARD JOSEPH KRAMER, a citizen of the United States, and a resident of Green Bay, in the county of Brown and State of Wisconsin, have invented certain new and useful Improvements in Tack Drivers, of which the following is a specification.

This invention relates to improvements in implements for driving fastening means such as tacks, and it consists of the constructions, combinations and arrangements herein described and claimed.

An object of the invention is to provide an implement by means of which tacks, which are ordinarily quite difficult to handle, may be driven expeditiously.

Another object of the invention is to provide an implement of the character described adapted particularly for securing the covers on cheese boxes by means of tacks.

A further object of the invention is to provide a tack driving implement having a separate nozzle which can be opened to permit dislodging any bent tack or other obstruction.

Other objects and advantages appear in the following specification, reference being had to the accompanying drawings in which:

Figure 1 is a perspective view of the improved tack driving implement, the cover with which it is provided being shown removed, Figure 2 is a central longitudinal section of the implement taken substantially on the line 2—2 of Fig. 1.

Figure 7 is a detail side elevation of the driving mechanism, the discharge nozzle being shown open, Figure 8 is a plan view of the barrel casting, Figure 9 is a plan view of the tack control disk, Figure 10 is a cross section on the line 10—10 of Figure 9, Figure 11 is a detail sectional view of the control standard, taken on the line 11—11 of Fig. 7, Figure 12 is a detail sectional view on the line 12—12 of Figure 7, Figure 13 is a detail plan view of the control operating arm, Figure 14 is a detail sectional view of the end of the operating arm disclosing the dog.

Upon reference to Fig. 1 it is seen that provision is made of a box 1 into which a quantity of tacks T of the required size is deposited in readiness for the operation of the implement. The box is equipped with a cover 2 by which the tacks are prevented from spilling.

Figure 3:
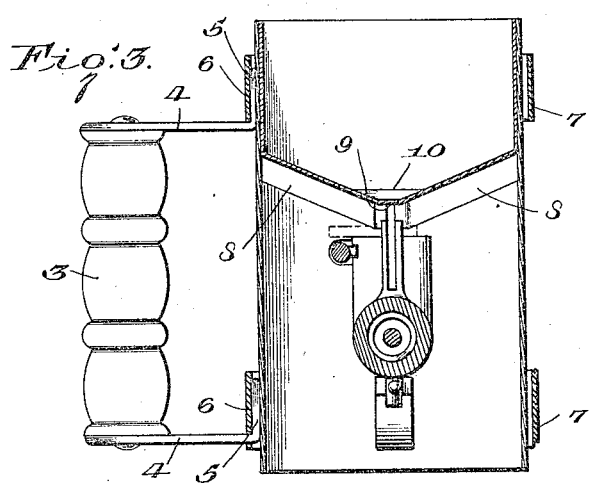
Figure 3 is a cross section taken substantially on the line 3—3 of Figure 2.

The implement is held by a handle 3 which has plates 4 with upturned ends 5 for the purpose of entering upwardly in either of the pairs of cleats 6 and 7 on opposite sides of the box 1 (Fig. 3). The handle ends 5 are insertible into either pair of cleats so both right and left-hand operators may be accommodated.

Situated in the box is the bottom 8. The bottom slopes downwardly toward the longitudinal central slot 9 through which the shanks of the tacks extend as they assume positions in readiness for driving. The heads of the tacks ride upon the bottom at the sides of the slot. The bottom and slot also slope forwardly to the point of emergence which occurs beneath an apron 10. The apron insures an orderly arrangement of the tacks so that there may be no clogging at said point of emergence.

Figure 5:
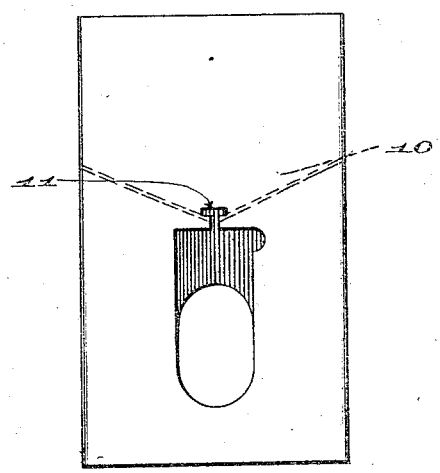
Figure 5 is a front elevation of the tack box alone.

The slot at this point is shaped like a T, as shown at 11 in Fig. 5. The apron thus produces what is well termed a tack retaining tunnel 12. The tunnel 12 has an associated guide 56 particularly for the purpose of directing the tack shanks. Upon emerging at the point 11 (Fig. 5) the tacks are taken up by the disk 13, this disk having peripheral pockets 14 for the purpose. A short turn of the disk upon its axial screw 15 deposits the nearest tack point-first into the opening 16 of the discharge channel 17 in the nozzle 18.

A ball 19 checks the disk 13 periodically so that it is held each time a tack is deposited into the opening 16. The ball is pressed upwardly against the disk and into shallow concavities 19 (Fig. 9) by a spring 20 (Fig. 2). A guard 21 provides a partial support for the screw 15, and covers parts of the control disk 13.

Figure 4:
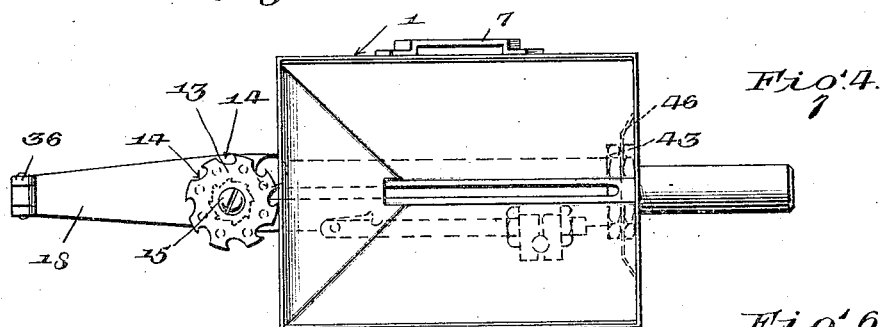
Figure 4 is a plan view of the implement, the cover being omitted.

A ratchet 22 has a dowel pin connection at 23 (Figs. 9 and 10) with the control disk so that the disk will turn upon operation of the ratchet. The ratchet is operated by a dog 24 in the left extremity of the control operating arm 25. The arm has a recess 26 in which the dog is pivoted at 27 (Figs. 4, 13 and 14) and from which it is pressed outwardly by a spring 28.

The discharge nozzle 18 is part of the barrel 29 which has a boss 30, the recess 31 of which is occupied by the ratchet 22. The nozzle is therefore to be regarded as being relatively stationary. It is the barrel that carries the guide 56 mentioned before. The barrel includes the lug 32 (Figs. 2 and 7) through which a latch 33 extends in order to reach the keeper 34 and retain the gate 35. This gate is hinged at 36 upon the nozzle 18, and when closed (Figs. 1 and 2) completes the nozzle.

Beneath the latch there is a trigger 37 by which the latch is pulled back against the tension of the spring 38 to let the gate open. Any obstruction is then readily removed from the discharge channel. The trigger is secured by a screw 39. The latch has a slot 40 which is occupied by a screw or other means 41 to limit the movement. The right end of the latch is guided by lug 42 beneath the barrel.

Figure 6:
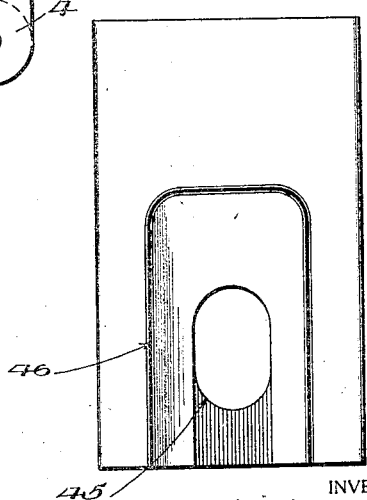
Figure 6 is a rear elevation of the tack box alone.

Nuts 43 clamp the barrel 29 in position in the tack box 1 beneath the bottom 8. The right end of the barrel is threaded at 44 to receive the nuts. The barrel is introduced in the box at an opening 45 (Fig. 6). This opening occurs in a sunken portion 46 in the end wall of the box.

A plunger 47 works in the bore of the barrel 29. This plunger is of barrel-bore diameter at 48 and of discharge channel diameter at 49. The large part is exposed at the right and is intended to be struck in order to cause the smaller part to project a tack out of the channel 17 and drive it into the work. In practice the plunger end 48 may be equipped with a kind of button to make hand striking easier.

The spring 50 keeps the plunger normally at the right end of its stroke. A slot 51 (Figs. 7, 11 and 12) makes room for the rib 52 of a clamp 53 through which a screw 54 passes to both secure the clamp to the plunger and to frictionally hold the control standard 55 upon which a somewhat similar clamp 56 (Fig. 13) secures the control operating arm 25. Each inward thrust of the plunger 47 is accompanied by a thrust of the arm 25 in the same direction, and upon the return stroke, under the influence of the spring 50, the dog 24 moves the ratchet 22 and disk 13 one step in the counter-clockwise direction.

The operation is readily understood. The handle 3 is first placed on one side or other of the box 1 to suit either a right or left-hand worker. The box is supplied with tacks T, and the cover 2 is set in place.

The end of the nozzle 18 is placed against the object to be tacked. The implement is ordinarily held and used in the upright position shown in the drawings. A blow is next struck upon the end 48 of the plunger 47. The plunger is thus forced inwardly, and a tack previously dropped point-first into the channel 17 through the opening 16 is driven out.

A prompt return of the plunger by the spring 50 permits driving tacks with considerable rapidity. It sometimes happens that a mutilated tack will get into the discharge channel. Upon such occurrence the latch 33 is pulled back by use of the trigger 37, making it possible to open the gate 35 upon its hinge 36 for the removal of the obstruction.

Each return stroke of the plunger 47 causes one step of the control disk 13. The dog 24 engages the ratchet 22 for operation upon such stroke. The forward stroke is idle for this purpose. Single tacks are thus dropped from the peripheral grooves 14 of the disk 13 into the opening 16.

While the construction and arrangement of the improved tack driving implement is that of a generally preferred form, obviously modifications and changes may be made without departing from the spirit of the invention or scope of the claims.

I claim:

1. A tack chuck comprising a relatively stationary nozzle having a discharge channel, a gate forming part of the nozzle, means by which it is hinged upon the discharge extremity of the stationary nozzle, and a latch engageable with the free extremity of the gate holding it closed but being movable to permit swinging the gate open for the removal of any obstruction in the channel.

2. A tack chuck comprising a nozzle having a discharge channel, a hinged gate forming part of the nozzle, a keeper on the gate, a spring latch engaging the keeper to keep the gate closed, and a trigger on the latch permitting pulling back thereon to free the keeper and release the gate.

3. A tack chuck comprising a nozzle having a discharge channel, a gate hinged at one end thereof forming part of the nozzle, a keeper on the gate, a latch, a spring to urge the latch into the keeper, means to guide the latch, and a trigger on the latch permitting pulling back thereon to release the keeper.

4. In combination with the barrel of a tack setting device, a tack chuck comprising a nozzle and lug fixedly carried by the barrel, a gate movably carried by the nozzle being swingable into contact with the nozzle and lug to complete the nozzle, a spring latch operable through the lug to secure the gate when closed, and means carried by the barrel assisting in the support of the latch.

EDWARD JOSEPH KRAMER.